May 23, 1961  R. G. AMES  2,984,857
MASTIC APPLICATOR AND FINISHING TOOL WITH A TROWELLING BAR
PRESSURE AND CURVATURE REGULATOR
Filed March 14, 1960  2 Sheets-Sheet 1

INVENTOR.
ROBERT G. AMES
BY
Munn & Liddy
ATTORNEYS

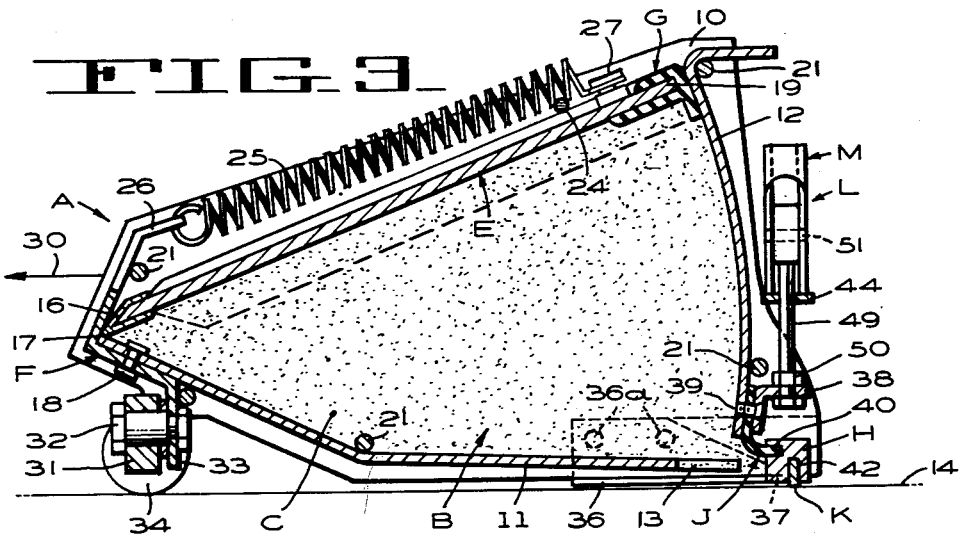
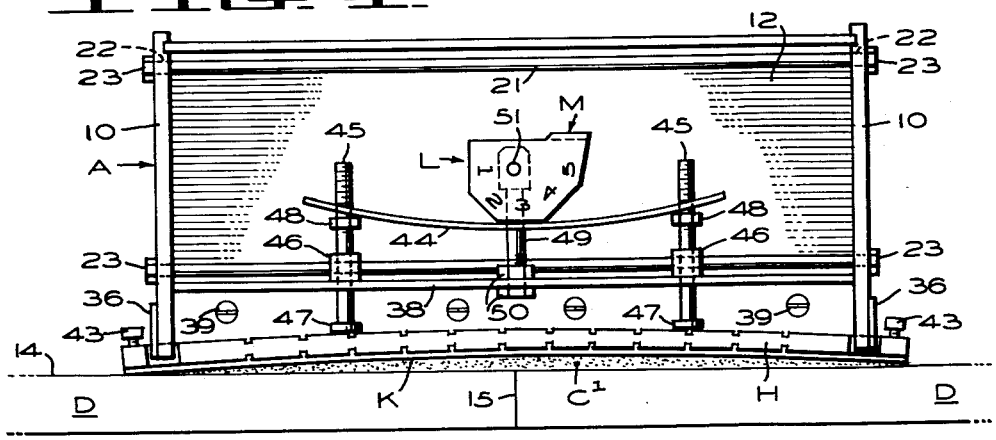

United States Patent Office 2,984,857
Patented May 23, 1961

2,984,857

MASTIC APPLICATOR AND FINISHING TOOL WITH A TROWELLING BAR PRESSURE AND CURVATURE REGULATOR

Robert G. Ames, 505 O'Neill Ave., Hillsborough, Calif.

Filed Mar. 14, 1960, Ser. No. 14,613

2 Claims. (Cl. 15—596)

The present invention relates to improvements in a mastic applicator and finishing tool with a trowelling bar pressure and curvature regulator. It has particular reference to improvements over the trowelling bar adjusting devices shown in my United States Patents Nos. 2,571,096; 2,666,323; 2,711,098; and 2,824,442.

In the foregoing mentioned patents, I provide mastic applying tools which are adapted to be moved over a surface, such as wall and ceiling boards, the tools being operable for discharging mastic upon the surface as the tools are advanced thereover. In each of these patents, the tool shown therein is provided with a resilient trowelling bar, which is disposed to trowel the mastic as the tool is advanced. Moreover, the trowelling bar is flexible for arching away from the surface to thereby form a crown on the trowelled mastic.

In Patents Nos. 2,571,096; 2,666,323; and 2,711,098; I provide adjusting nuts that are adapted to be turned for applying varying pressures to the trowelling bar so as to regulate the curvature of the trowelling bar, and thereby provide a desired crown on the trowelled mastic. In Patent No. 2,824,442, the arching of the trowelling bar is regulated by an adjustable wedge having an inclined surface. However, the particular setting of the adjusting nuts or wedge cannot be easily determined; and, therefore, the operator does not know in advance the curvature of the crown that will be formed on the mastic.

The cardinal object of the present invention is to provide improved embodiments of trowelling bar pressure and curvature regulators in which the adjustments thereof may be readily ascertained by visual inspection—a structural feature that is not provided in the above-identified patents.

More specifically stated, the present invention provides a rotatably-mounted cam knob which is swingable about an axis. The knob has a plurality of cam surfaces on its periphery, each being disposed at a different distance from the axis of rotation. Broadly speaking, means are interposed between the cam knob and the trowelling bar, and engageable with the cam surfaces for regulating the curvature of the bar, when the knob is turned. Each cam surface is identified by a distinctive indicia, whereby the setting of the knob may be readily ascertained.

Other objects and advantages will appear as the specification continues. The novel features of the invention will be pointed out in the annexed claims.

In the drawings:

For a better understanding of the invention, reference should be had to the accompanying drawings, forming part of this application, in which:

Figure 3 is a longitudinal sectional view taken along the plane III—III of Figure 1;

Figure 4 is a view similar to Figure 2, but disclosing the cam knob as being swung to a different setting, and further showing a crown being trowelled on the mastic; and Figure 5 is a rear elevational view of a modified form of the trowelling bar pressure and curvature regulator.

Detailed description

Figure 1:
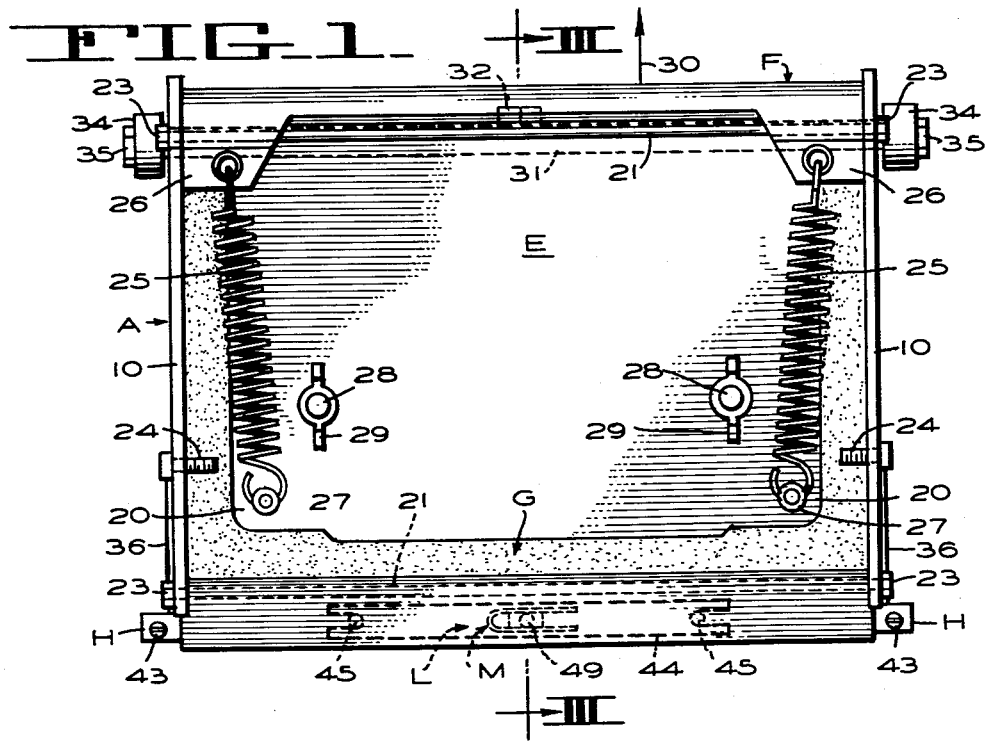
Figure 1 is a top plan view of one form of my mastic applicator and finishing tool with a trowelling bar pressure and curvature regulator.

Referring to the first embodiment of the invention, as shown in Figures 1 to 4, inclusive, the mastic-applying tool is designated generally at A, and is very similar to the tool illustrated in my United States Patent No. 2,824,442, dated February 25, 1958.

It will be noted that the tool A defines a housing that forms a compartment B on its interior, and this compartment is adapted to hold a body of mastic C therein (see Figure 3). This housing has a pair of spaced side plates 10, a rigid bottom wall 11, and an arcuate-shaped trailing end wall 12. The bottom wall 11 is fashioned with an outlet opening 13 through which the mastic C may be delivered to a surface 14, as the tool A is advanced. As shown in Figure 4, the surface 14 may be provided by wall or ceiling boards D that are butted together to form a joint 15 therebetweeen and over which a crowned layer $C^1$ of mastic is to be applied.

A mastic-pressing plate E is disposed in the compartment B above the mastic C, and has a bevelled front edge 16 that extends between the side plates 10 and is pivoted in a V-shaped recess 17 formed by a transversely-extending fulcrum plate F (see Figures 1 and 3). The plate F is secured by rivets 18 to the front end portion of the bottom wall 11. It will be observed that a resilient wiping gasket G is secured to the plate E so as to extend along the rear end 19 and the lateral edge portions 20 of this mastic-pressing plate. The gasket contacts with the inner surfaces of the side plates 10 and the arcuate trailing wall 12, thus precluding the mastic C from escaping upwardly around the plate E, when the latter is pressed downwardly toward the surface 14.

For the purpose of holding the side plates 10 against the bottom wall 11 and the arcuate trailing wall 12, a plurality of the rods 21 have been provided. These tie rods extend through openings 22 formed in the plates 10, the rods being provided with nuts 23 that bear against the exterior surfaces of the side plates.

Each side plate 10 is provided with a stop screw 24 which limit the swinging movement of the mastic-pressing plate E away from the bottom wall 11 (see Figures 1 and 3). Coil springs 25 have their front ends anchored to ears 26 formed on the fulcrum plate F, while the rear ends of these springs are attached to studs 27, the latter being fixed to the plate E. The tendency of the coil springs 25 is to yieldingly hold the mastic-pressing plate E against the stop screws 24.

Any suitable handle may be secured by studs 28 and wing nuts 29 to the plate E so as to advance the mastic-applying tool A over the surface 14 in the direction of the arrow 30; and, at the same time, depress the plate E so as to force mastic C from the compartment B and through the outlet opening 13. One type of handle is shown in my Patent No. 2,824,442.

In order to support the leading end of the tool A as the latter is advanced, the center of an axle 31 is swingably secured by a bolt 32 to a flange 33 that depends from the fulcrum plate F (see Figures 1 and 3). Rollers 34 are rotatably secured to the opposite ends of the axle 31 by cap screws 35. These rollers are adapted to ride over the surface 14. The trailing ends of the side plates 10 have angle-shaped wear shoes 36 secured thereto by screws 36a. These wear shoes are adapted to slide along the surface 14 as the tool A is advanced. The rollers 34 and the wear shoes 36 constitute supports for the mastic-applying tool.

Moreover, the mastic-applying tool A has a flexible guide strip H extending transversely thereacross, and having its opposite ends anchored to the side plates 10 by fingers 37 projecting rearwardly from the wear shoes 36 (see Figure 3). A flexible wall portion J is secured by an angle-shaped member 38 and screws 39 to the lower end of the arcuate trailing wall 11. Also, the flexible wall portion J is clamped in a groove 40 that extends lengthwise of the guide strip H. This arrangement will permit the guide strip to be arched, as shown in Figure 4, when the layer $C^1$ of mastic crowds thereunder.

A resilient trowelling bar K is carried by the guide strip H, the latter being fashioned with a groove 42 into which the trowelling bar extends. Set-screws 43 are threaded into the end sections of the strip H and may be adjusted so as to extend the trowelling bar a desired distance below the guide strip.

The parts of the mastic-applying tool A, the guide strip H and the trowelling bar K thus far described form no part of the present invention, except insofar as they cooperate with the parts now to be set forth.

The first embodiment of my improved trowelling bar pressure and curvature regulator is designated generally at L in Figures 1 to 4, inclusive. As shown therein, a resilient lever 44 is disposed to extend lengthwise of the guide strip H and the trowelling bar K. A pair of spaced pressure-regulating pins 45 are interposed between the lever 44 and the guide strip H for applying pressure at separated points along the guide strip to reduce arching of the trowelling bar K, and to reduce the curvature of the crown on the trowelled layer $C^1$ of the mastic.

Figure 2:
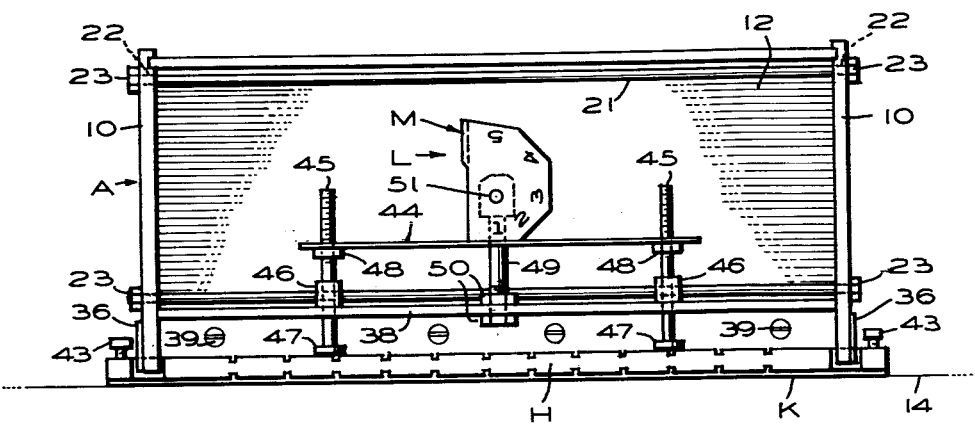
Figure 2 is a rear elevational view thereof showing the trailing end of the tool.

The pressure-regulating pins 45 are guided for vertical movement by bearing sleeves 46 that are supported by the angle shaped member 38 (see Figures 2 and 4). The lower end of each pin 45 has a head 47 that bears against the upper surface of the guide strip H. Nuts 48 are adjustably threaded on the pins 45 at points immediately below the resilient lever 44 and upon which the lever rests.

As shown in Figures 2, 3 and 4, a rod 49 is arranged between the pins 45 and is anchored by nuts 50 to the angle shaped member 38. A cam knob M is secured to the upper end of the rod 49 by a journal pin 51 for swinging about the floating axis of this pin. The knob M has a plurality of cam surfaces on its periphery, each cam surface being identified by a distinctive indicia, here shown by the numerals 1, 2, 3, 4 and 5.

Each cam surface (1—5) is positioned to selectively bear against the resilient lever 44 when the knob M is rotated about the axis of the pin 51. It will be noted that each cam surface is disposed at a different distance from the axis of the pin 51, whereby varying pressures may be applied to the guide strip H and trowelling bar K to regulate the curvature of the bar. The cam surfaces 1—5 are arranged in succession around the periphery of the knob M, and the distance of each cam surface from the axis of rotation is progressively increased over the distance of the preceding cam surface from the axis.

It will be apparent from Figures 2 that the knob M has been set so that the cam surface 1 is bearing against the resilient lever 44. At this time, the guide strip H and the trowelling bar K are substantially straight. But in Figure 4, the knob M has been turned until the cam surface 3 bears against the lever 44, and this will cause the pressure-regulating pins 45 to press downwardly on the guide strip H and thus resist upward arching of the trowelling bar K. However, Figure 4 further discloses the layer $C^1$ of mastic being forced under the trowelling bar, and thus the latter will trowel a crown on the mastic being delivered to the surface 14, as the tool A is advanced.

Turning now to Figure 5, a modified form of the trowelling bar pressure and curvature regulator is indicated generally at $L^1$. The mastic-applying tool A is identical with the tool previously described, and like reference characters have been applied to corresponding parts.

In Figure 5, a pair of spaced posts 52 are fixed by nuts 53 to the angle-shaped member 38. These posts provide supports for the opposite ends of a resilient lever 54, the latter extending lengthwise of the guide strip H and the trowelling bar K. The intermediate portion of the lever 54 is flexible toward and away from the guide strip and trowelling bar.

It will be noted that a vertically movable rod 55 is arranged between the posts 52, and has its lower end anchored by a clip 56 to the guide strip H in Figure 5. Moreover, a cam knob M of the same construction as previously described is rotatably secured by a pin 51 to the upper end of the rod 55. Here, the cam surface 1 of the knob bears against the lever 54. Obviously, when the knob M is rotated to bring another cam surface, such as 3, into engagement with the lever 54, the rod 55 and clip 56 will pull upwardly on the guide strip H, thereby arching the trowelling bar K. A pair of coil springs 57 are interposed between the angle-shaped member 38 and the guide strip H to resist upward arching of the later.

I claim:
1. In a mastic applicator and finishing tool with a trowelling bar pressure and curvature regulator: a mastic applying tool movable over a surface, and being operable for discharging mastic upon the surface; a resilient trowelling bar carried by the tool, and being disposed to trowel a crown on the discharged mastic; a cam knob rotatably supported for rotation about a floating axis, whereby the knob may move up and down; the knob having a plurality of flat-faced cam surfaces arranged in consecutive order on its periphery, each being disposed at a different distance from said axis than the other cam surfaces; the distance of each cam surface from said axis progressively increasing over the distance of the preceding cam surface from said axis; and means interposed between the cam knob and the trowelling bar, and being engageable with the cam surfaces for regulating curvature of the trowelling bar, when the knob is turned; said means including a resilient lever disposed to extend lengthwise of the trowelling bar, and having its opposite ends supported; the intermediate portion of the resilient lever being flexible toward and away from the trowelling bar; the intermediate portion of the resilient lever being disposed to have a selected flat-faced cam surface bear thereagainst, when the knob is turned about said axis; the selected flat-faced cam surface being movable into parallel and contacting relation with the intermediate portion of the resilient lever, whereby the knob will be yieldingly retained in adjusted position by the resilient lever.

2. The mastic applicator and finishing tool with a trowelling bar pressure and curvature regulator, as defined in claim 1; and in which each flat-faced cam surface of the knob is identified by a distinctive indicia, whereby the curvature of the crown that will be formed on the discharged mastic may be readily ascertained in advance by visual inspection of the adjusted knob.

References Cited in the file of this patent

UNITED STATES PATENTS

| | | |
|---|---|---|
| 2,666,323 | Ames | Jan. 19, 1954 |
| 2,711,098 | Ames | June 21, 1955 |
| 2,824,442 | Ames | Feb. 25, 1958 |
| 2,891,784 | Taylor | June 23, 1959 |

UNITED STATES PATENT OFFICE
CERTIFICATE OF CORRECTION

Patent No. 2,984,857                      May 23, 1961

Robert G. Ames

It is hereby certified that error appears in the above numbered patent requiring correction and that the said Letters Patent should read as corrected below.

In the heading to the printed specification, line 5, for "Robert G. Ames, 505 O'Neill Ave., Hillsborough, Calif." read -- Robert G. Ames, Hillsborough, Calif. (505 O'Neill Ave., Belmont, Calif.) --.

Signed and sealed this 28th day of November 1961.

(SEAL)
Attest:

ERNEST W. SWIDER
Attesting Officer

DAVID L. LADD
Commissioner of Patents

USCOMM-DC